T. M. TERWILLIGER, Jr.
COMBINED BOX FASTENER AND OPENER.
APPLICATION FILED NOV. 5, 1917.
1,323,335.
Patented Dec. 2, 1919.
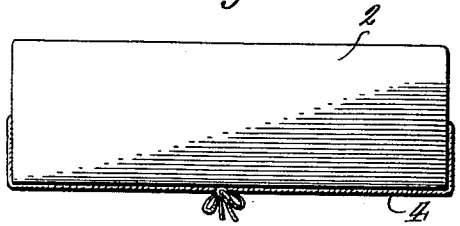
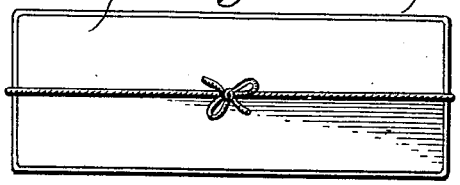
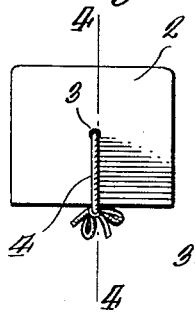
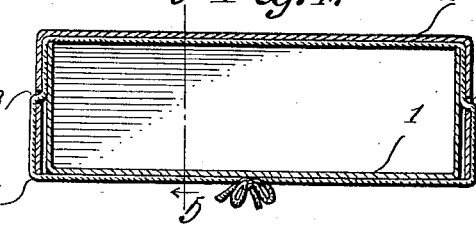
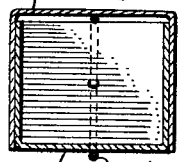
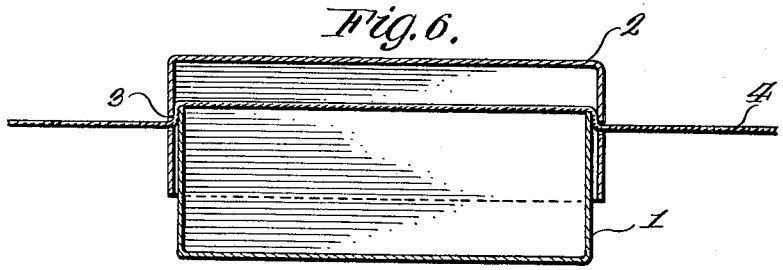
WITNESSES
INVENTOR
Thomas M. Terwilliger, Jr.
BY
ATTORNEY

UNITED STATES PATENT OFFICE.

THOMAS MANSFIELD TERWILLIGER, JR., OF WALDEN, NEW YORK.

COMBINED BOX FASTENER AND OPENER.

1,323,335.  Specification of Letters Patent.  Patented Dec. 2, 1919.

Application filed November 5, 1917. Serial No. 200,387.

*To all whom it may concern:*

Be it known that I, THOMAS MANSFIELD TERWILLIGER, Jr., a citizen of the United States, residing at Walden, in the county of Orange and State of New York, have invented certain new and useful Improvements in Combined Box Fasteners and Openers, of which the following is a specification.

This invention relates to boxes and contemplates the use of a combined fastener and opener for the box.

The invention is designed for use on boxes of the smaller type to secure the box closure and to permit expeditious removal of the inclosure when access is to be gained to the interior of the box.

Another object of the invention is to economize in the use of cord likewise to prevent the cord from slipping off the box thereby facilitating transportation of receptacles of this nature.

The above and other objects and advantages of this invention will be in part described, and in part understood from the following description of the present preferred embodiment, the same being illustrated in the accompanying drawings, in which:

Figure 1 is a side elevational view of a box embodying my invention.

Fig. 2 is a bottom plan view of the same.

Fig. 3 is an end elevational view.

Fig. 4 is a longitudinal sectional view taken on the line 4—4 of Fig. 3.

Fig. 5 is a cross sectional view taken on the line 5—5 of Fig. 4, and

Fig. 6 is a longitudinal sectional view of a box embodying my invention, the box closure being shown in an elevated position.

In the drawings a box of an oblong configuration is shown, comprising a body 1 and a closure 2. As shown to advantage in Fig. 4 of the drawings, the body 1 fits into the closure 2 and is completely housed by the latter. The closure has openings 3 formed in its end preferably approximately midway the top and bottom of the closure.

A cable or cord 4 is trained through said openings 3 and has the ends thereof extended beyond the ends of the closure adapted to embrace the bottom of the body 1 of the box, the cord having a wedging action between the opposing faces at the ends of the said sections when they are brought into telescoping relationship. It will be noted from Fig. 5 of the drawings that the cord 4 engages the upper margin of the body 1 so that the cord will not come in contact with the contents of said body.

In use of the box it will be appreciated that the body 1 is filled in the usual manner pursuant to which the closure 2 which we will assume has been equipped with the cord 4 is placed over the body 1 and pressed downwardly thereover in a manner indicated in Fig. 6. In this way the cord 4 will be drawn taut across the top of the body 1 while intermediate portions thereof will snugly engage the ends of the body as shown in Fig. 4. The terminals of the cord are then brought together subjacent the body 1 and secured in any suitable manner. When it is desired to remove the contents of the box, the ends of the cord are disengaged and pressure exerted thereon causing the closure 2 to be elevated thereby facilitating its removal.

It is to be understood that although this device is shown on a box of an oblong configuration that it can be used equally as well with any other configuration of box or other receptacle, without destroying it in any way, thus the device can be used over again a number of times.

It will be understood that the above description and accompanying drawings comprehend only the general and preferred embodiment of my invention and that various minor changes in details of construction, proportion and arrangement of parts may be made within the scope of the appended claim without sacrificing any of the advantages of my invention.

I claim:

A combined box fastener and opener including a telescoping body and closure section, a cord engaging the upper edge of the body section at the ends thereof, said cord having its ends extending through openings formed approximately in the center of the ends of the closure section, and embracing the bottom of the body section for securely holding the sections together, and a wedge formed between the opposing faces at the ends of the telescoping sections by the passing of the cord therebetween, tension on the terminals of said cord causing the elevation of the closure section to facilitate the removal thereof.

In testimony whereof I affix my signature in presence of two witnesses.

THOMAS MANSFIELD TERWILLIGER, Jr.

Witnesses:
GROVER C. SILKWORTH,
GEORGE E. SHAFER.